Patented Aug. 10, 1937

2,089,913

UNITED STATES PATENT OFFICE 2,089,913

IMPROVEMENTS IN THE PRODUCTION OF CHLORINE DIOXIDE

George Lewis Cunningham, Niagara Falls, N. Y., assignor to The Mathieson Alkali Works, Inc., New York, N. Y., a corporation of Virginia No Drawing. Application February 9, 1934, Serial No. 710,531

4 Claims. (Cl. 23—152)

This invention relates to improvements in the production of chlorine dioxide. More particularly the invention relates to the production of gas mixtures containing chlorine as well as chlorine dioxide but in which the ratio $ClO_2:Cl_2$ approximates, for example, 5–10:1.

According to the present invention gaseous chlorine dioxide is evolved by reacting an aqueous solution of a metal chlorate with sulfur dioxide. The soluble chlorates generally are useful in carrying out my invention; the chlorates of the class consisting of the alkali metals, the alkaline earth metals and magnesium are, however, used with advantage. The efficiency of the reaction of the invention, for the production of chlorine dioxide, depends primarily upon the concentration of the aqueous chlorate solution used. A solution containing from about 25 to about 100 parts by weight of the metal chlorate per 100 parts of water is used with advantage. With chlorate concentrations below the optimum range, reduction tends to go too far involving loss of chlorine dioxide. When chlorate concentration is above the optimum range, the ratio $ClO_2:Cl_2$, referring to the evolved gas mixture including chlorine dioxide, tends to diminish. Also, to promote a maximum recovery of chlorine dioxide contaminated to a minimum by chlorine, the ratio of chloride ions to chlorate ions in the aqueous chlorate solution used should not substantially exceed unity. The reaction is with advantage carried out at a temperature, for example, approximating 20°–25° C.

The sulfur dioxide supplied to the reaction as a gas need not be supplied in high concentration but is with advantage supplied in admixture with an inert gaseous diluent such as nitrogen. For example, the gas mixture from sulfur burners of conventional type, including the nitrogen content of the air supplied for combustion as well as sulfur dioxide, may be used with advantage in carrying out the invention. The inert gaseous diluent assists in stripping the chlorine dioxide formed by the reaction from the aqueous chlorate solution. Sulphur dioxide should not be supplied to the reaction in high concentration since if the percentage of sulphur dioxide is too high the chlorate ion will be reduced to chloride and little or no chlorine dioxide will be formed.

The invention will be further illustrated by the following examples of operations embodying the invention:

*Example 1.*—A gas mixture from a conventional sulfur burner is passed through an aqueous solution consisting essentially of 14.74 parts (by weight) of $MgCl_2$, 34.48 parts of $Mg(ClO_3)_2$ and about 100 parts of water at a temperature of 20°–25° C. until the evolution of chlorine dioxide ceases, or until about 19.7 parts of $SO_2$ have been absorbed. The gaseous products of the reaction include about 15.1 parts $ClO_2$ and about 1.9 parts of $Cl_2$. After evaporating 23.3 parts of HCl from the remaining liquor, 37.1 parts of $MgSO_4$ and 22.3 parts $MgCl_2$ remain in solution; this magnesium sulfate and magnesium chloride can be recovered by further concentration and crystallization.

*Example 2.*—A gas mixture from a conventional sulfur burner is passed through an aqueous solution consisting essentially of 95 parts of $NaClO_3$ and 100 parts of water acidified with about 0.1 of its volume of normal HCl at a temperature of 20°–25° C. until the evolution of chlorine dioxide ceases. A gas mixture including chlorine dioxide and chlorine in ratios as high as 8–9:1 is evolved.

*Example 3.*—A gas mixture including sulfur dioxide from a conventional sulfur burner is passed through a saturated aqueous solution of calcium chlorate at a temperature of 20°–25° C. until the evolution of chlorine dioxide ceases. A gas mixture including chlorine and chlorine dioxide in ratios as high as 7–8:1 is evolved.

The invention has several advantages. The necessary reagents are inexpensive and the operations involved are simple. It is also possible to produce chlorine dioxide in accordance with this invention without incurring serious risks because of explosion hazards. Reaction temperatures exceeding 60° C. are to be avoided because of danger of explosion at higher temperatures; the reaction involved in carrying out this invention, however, can be carried out efficiently and effectively at temperatures well below this limit.

I claim:

1. In the production of chlorine dioxide, the improvement which comprises reacting an aqueous solution of a metal chlorate containing about 25–100 parts by weight of the metal chlorate per 100 parts of water with sulfur dioxide in the presence of an inert gaseous diluent and thereby evolving gaseous chlorine dioxide.

2. In the production of chlorine dioxide, the improvement which comprises reacting an aqueous solution of a chlorate of the class consisting of the alkali metals, the alkaline earth metals and magnesium with sulfur dioxide in the presence of an inert gaseous diluent at a temperature not exceeding about 60° C., said aqueous solution containing about 25–100 parts by weight of the chlorate per 100 parts of water, and thereby evolving gaseous chlorine dioxide.

3. In the production of chlorine dioxide, the improvement which comprises reacting an aqueous solution of a metal chlorate containing about 25-100 parts by weight of the metal chlorate per 100 parts of water in which the ratio of chloride ions to chlorate ions does not substantially exceed unity with sulfur dioxide in dilute concentration and thereby evolving gaseous chlorine dioxide.

4. In the production of chlorine dioxide, the improvement which comprises reacting an aqueous solution of a metal chlorate containing about 25-100 parts by weight of the metal chlorate per 100 parts of water with sulfur dioxide in the presence of an inert gaseous diluent at a temperature not exceeding about 60° C. and thereby evolving gaseous chlorine dioxide.

GEORGE LEWIS CUNNINGHAM.